United States Patent
Su et al.

(10) Patent No.: US 8,032,828 B2
(45) Date of Patent: Oct. 4, 2011

(54) METHOD AND SYSTEM OF DOCUMENT TRANSFORMATION BETWEEN A SOURCE EXTENSIBLE MARKUP LANGUAGE (XML) SCHEMA AND A TARGET XML SCHEMA

(75) Inventors: Hong Su, Worcester, MA (US); Harumi Anne Kuno, Cupertino, CA (US); Elke Angelika Rundensteiner, Acton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1147 days.

(21) Appl. No.: 10/091,237

(22) Filed: Mar. 4, 2002

(65) Prior Publication Data

US 2003/0167445 A1 Sep. 4, 2003

(51) Int. Cl.
*G06F 17/00* (2006.01)
*G06F 17/30* (2006.01)

(52) U.S. Cl. ......... 715/235; 715/236; 707/756; 707/803

(58) Field of Classification Search .................. 715/523, 715/513, 501.1, 205, 234, 239, 206, 236, 715/249, 235; 707/756, 803

See application file for complete search history.

(56) References Cited

U.S. PATENT DOCUMENTS

| | | | | |
|---|---|---|---|---|
| 6,119,130 A * | 9/2000 | Nguyen et al. | ................. | 707/695 |
| 6,480,865 B1 * | 11/2002 | Lee et al. | ...................... | 715/234 |
| 6,487,566 B1 * | 11/2002 | Sundaresan | .................... | 715/235 |
| 6,507,857 B1 * | 1/2003 | Yalcinalp | ...................... | 715/513 |
| 6,654,734 B1 * | 11/2003 | Mani et al. | .......................... | 707/2 |
| 6,748,569 B1 * | 6/2004 | Brooke et al. | ................. | 715/207 |
| 6,763,343 B1 * | 7/2004 | Brooke et al. | ..................... | 707/1 |
| 6,772,413 B2 * | 8/2004 | Kuznetsov | ...................... | 717/136 |
| 6,823,495 B1 * | 11/2004 | Vedula et al. | .................. | 715/805 |
| 6,845,380 B2 * | 1/2005 | Su et al. | ....................... | 707/102 |
| 6,874,141 B1 * | 3/2005 | Swamy et al. | ................. | 717/144 |
| 6,950,984 B2 * | 9/2005 | Hori et al. | ...................... | 715/229 |
| 7,072,896 B2 * | 7/2006 | Lee et al. | ...................... | 707/101 |
| 7,076,728 B2 * | 7/2006 | Davis et al. | ..................... | 715/205 |
| 7,107,521 B2 * | 9/2006 | Santos | ......................... | 715/235 |
| 7,114,147 B2 * | 9/2006 | Ballantyne et al. | ........... | 717/107 |
| 7,120,869 B2 * | 10/2006 | Birder | ........................... | 715/234 |
| 7,159,185 B1 * | 1/2007 | Vedula et al. | .................. | 715/763 |
| 2001/0018696 A1 * | 8/2001 | Hori et al. | ...................... | 707/513 |
| 2001/0044811 A1 * | 11/2001 | Ballantyne et al. | ........... | 707/513 |
| 2001/0056504 A1 * | 12/2001 | Kuznetsov | ...................... | 709/310 |
| 2002/0035579 A1 * | 3/2002 | Wang et al. | ..................... | 707/513 |
| 2002/0111964 A1 * | 8/2002 | Chen et al. | ..................... | 707/513 |
| 2002/0123878 A1 * | 9/2002 | Menke | ............................... | 704/2 |
| 2002/0133516 A1 * | 9/2002 | Davis et al. | .................... | 707/513 |
| 2002/0143644 A1 * | 10/2002 | Tosun et al. | ..................... | 705/26 |
| 2002/0143816 A1 * | 10/2002 | Geiger et al. | .................. | 707/513 |
| 2002/0143821 A1 * | 10/2002 | Jakubowski | .................. | 707/522 |

(Continued)

OTHER PUBLICATIONS

De Boer, Berend, "Tutorial: don't be afraid of XSLT", eurotex 2001, Sep. 2001, pp. 1-17.*

(Continued)

*Primary Examiner* — Robert Stevens

(57) ABSTRACT

A method and system for the transformation of extensible markup language (XML) documents. Specifically, one embodiment of the present invention discloses a method comprising modeling a source XML document corresponding to a source schema as a source tree having a plurality of source nodes, and modeling a target XML document corresponding to a target schema as a target tree having a plurality of target nodes. A sequence of transformation operations that transforms the source tree to the target tree is then generated.

24 Claims, 11 Drawing Sheets

U.S. PATENT DOCUMENTS

| | | | |
|---|---|---|---|
| 2002/0147745 A1* | 10/2002 | Houben et al. | 707/513 |
| 2002/0194220 A1* | 12/2002 | Sluiman | 707/513 |
| 2003/0074181 A1* | 4/2003 | Gharavy | 704/1 |
| 2003/0163597 A1* | 8/2003 | Hellman et al. | 709/316 |
| 2003/0167254 A1* | 9/2003 | Su et al. | 707/1 |
| 2004/0205549 A1* | 10/2004 | Yassin et al. | 715/513 |
| 2004/0205615 A1* | 10/2004 | Birder | 715/523 |
| 2004/0216030 A1* | 10/2004 | Hellman et al. | 715/500 |
| 2005/0086584 A1* | 4/2005 | Sampathkumar et al. | 715/501.1 |

OTHER PUBLICATIONS

"eurotex 2001: The Program", Sep. 2001, pp. 1-3 (downloaded from www.ntg.nl/eurotex/program.html).*

"eurotex 2001: The Presentations and Tutorials", Sep. 2001, pp. 1-2 (downloaded from www.ntg.nl/eurotex/presentations.html).*

De Boer, Berend, "From Database to Presentation via XML, XSLT and ConTEXT", dtd: Jan. 28, 2002, pp. 52-67.*

Harold, Elliotte Rusty, XML Bible, 2nd Edition, "Chapter 17: XSL Transformations", Hungry Minds, Inc., Indianapolis, IN, Internet download of web page dated Aug. 2, 2001, pp. 1-70 (plus Wayback Machine citation/URL page).*

Soinio, Timi, "Using XML in Web Services: Vision of the Future", Univ. of Tampere, Dept of Computer and Info Sciences, Masters Thesis, Jun. 2000, pp. Abstract and 28-32 (plus Google search entry, which provides URL for this paper).*

Jeong, Euna, et al, "Induction of Integrated View for XML Data with Heterogeneous DTDs", CIKM '01, Nov. 5-10, 2001, ACM 1-581 (13-436-3/01/0011), pp. 151-158.*

Qiang, Cao Xiao, "IBM WebSphere Software Platform for e-Business: XML Review", IBM Solution Enablement Center Presentation, May 19, 2001, pp. 1-20.*

"Oracle9i XML Reference, Release 1 (9.0.1)", Part No. A88899-01, Oracle Corp., Redwood City, CA, Jun. 2001, pp. i to x and 1-30 to 1-33.*

Claypool, Kajal T., et al., "Gangam—A Solution to Support Multiple Data Models, Their Mappings and Maintenance", ACM SIGMOD, May 21-24, 2001, Santa Barbara, CA, p. 606 [ACM 1-58113-332-4/01/05].*

Su, Hong, et al., "Automating the Transformation of XML Documents", WIDM 2001, Nov. 2001, Atlanta, GA, pp. 68-75 (plus citation page) [ACM 1-58113-444-4/01/11].*

Pietriga, Emmanuel, et al., "VXT: A Visual Approach to XML Transfomations", DocEng '01, Nov. 9-10, 2001, Atlanta, GA, pp. 1-10.*

Su, Hong, et al., "Automating Transformation of XML Documents", WIDM 2001 Powerpoint Presentation, Atlanta, GA, Nov. 2001, pp. 1-29.*

Su, Hong, et al., "XEM: Managing the Evolution of XML Documents", Eleventh International Workshop on Research Issues in Data Engineering (RIDE 2001), Heidelberg, Germany, Apr. 1-2, 2001, pp. 1-8.*

Su, Hong, et al., "Identification of Syntactically Similar DTD Elements for Schema Matching", The Second International Conference on Web-Age Information Management (Waim 2001), Xi'an, China, Jul. 2001, pp. 1-13.*

Claypool, Kajal T., et al., "Model Management—A Solution to Support Multiple Data Models, Their Mappings and Maintenance", ACM SIGMOD '01 Industrial Demo, Santa Barbara, CA, May 2001, pp. 1-5.*

Buneman, Peter, et al, "UnQL: A Query Language and Algebra for SemiStructured Data Based on Structural Recursion", The VLBD Journal, Issue No. 9, Springer-Verlag, © 2000, pp. 76-110.*

Lo, Ming-Ling, et al., "XAS: A System for Accessing Componentized, Virtual XML Documents", Proceedings of the 23rd International Conference on Software Engineering, Jul. 2001, pp. 493-502 (plus citation sheet).*

Moh, Chuang-Hue, et al., "Re-Engineering Structures from Web Documents", Proceedings of the 5th International Conference on Digital Libraries, Jun. 2000, pp. 67-76 (plus citation sheet) [ACM 1-58113-231-X/00/0006].*

Abiteboul, Serge, et al., "Compact Labeling Schemes for Ancestor Queries", Proceedings of the 12th Annual ACM-SIAM Symposium on Software Engineering, Jan. 2001, pp 547-556 (plus citation sheet).*

Fernandez, Mary, et al., "Efficient Evaluation of XML Middle-ware Queries", ACM SIGMOD 2001, May 21-24, 2001, pp. 103-114 [ACM 1-58113-332-4/01/05].*

Bonifati, Angela, et al, "Comparative Analysis of Five XML Query Languages", SIGMOD Record, vol. 29 No. 1, Mar. 2000, pp. 68-79.*

Wallace, Malcolm, et al., "Haskell and XML: Generic Combinators or Type-Based Translation?", ICFP '99, Paris, France, Sep. 1999, pp. 148-159 [ACM 1-58113-111-9/99/0009].*

Su, Hong, et al., "Automating Transformation of XML Documents", WIDM 2001, Atlanta, GA, Nov. 2001, pp. 1-25. (downloaded in pdf format from: www.cs.wpi.edu/~suhong/research/PAPERS/xtra-journal.ps).*

Eder, Johann, et al., "Composition of XML-Transformations", EC-Web 2001, Munich, Germany, Sep. 4-6, 2001, Lecture Notes in Computer Science, vol. 2115/2001, pp. 71-80.*

Pietriga, Emmanuel, et al., "VXT: A Visual Approach to XML Transformations", DocEng OI, Atlanta, GA, Nov. 9-10, 2001, pp. 1-10.*

Schlieder, Torsten, "Similarity Search in XML Data Using Cost-Based Query Transformations", WebDB '01, Santa Barbara, Ca, May 2001, pp. 1-6.*

Onizuka, Makoto, et al., "XTL: An XML Transformation Language and XSLT generator for XTL", Extreme Markup Languages 2001, Montreal, Quebec, Aug. 14-17, 2001, pp. i and 1-26.*

* cited by examiner

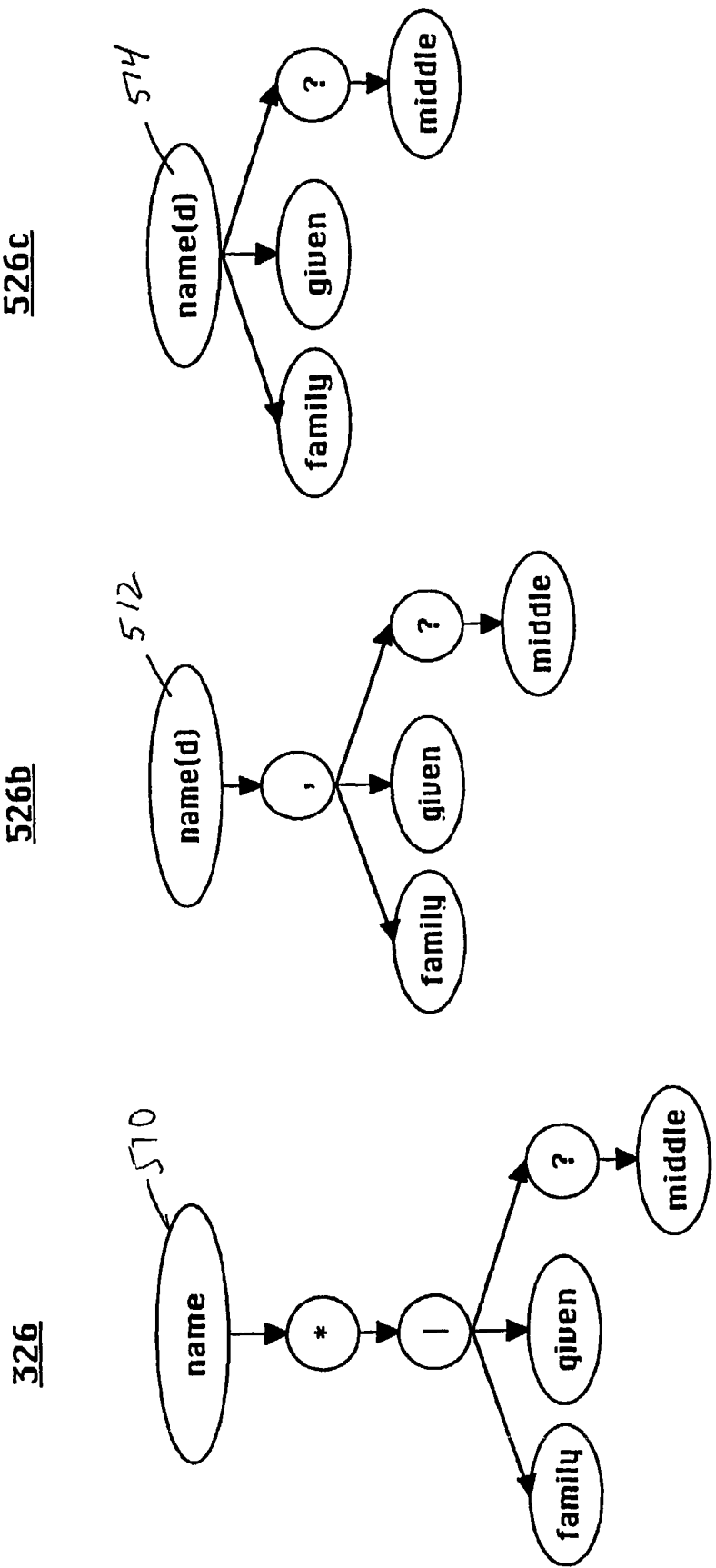

METHOD AND SYSTEM OF DOCUMENT TRANSFORMATION BETWEEN A SOURCE EXTENSIBLE MARKUP LANGUAGE (XML) SCHEMA AND A TARGET XML SCHEMA

TECHNICAL FIELD

More specifically, the present invention relates to document transformation between a source Extensible Markup Language (XML) schema and a target XML schema

BACKGROUND ART

Web services are significantly more loosely coupled than traditional applications. Web Services are deployed on the behalf of diverse enterprises, and the programmers who implement them are unlikely to collaborate with each other during development. However, the purpose of web-services is to enable business-to-business interactions. As such, one of the goals of web services is for the discovery of new services that allow interaction without requiring programming changes to either service.

The advent of web services that use XML-based message exchanges has spurred many efforts to address issues related to inter-enterprise service electronic commerce interactions. Currently, emerging standards and technologies enable enterprises to describe and advertise their own Web Services and to discover and determine how to interact with services fronted by other businesses. However, these technologies do not address the problem of how to reconcile structural differences between similar types of documents supported by different enterprises. Heretofore, transformations between such documents was a manual process created on a case-by-case basis.

For example, Service A and Service B are services provided by different companies. Suppose that these services want to engage in a shopping cart interaction, and that Service B requires Service A to submit a shipping information document. Service A might be able to provide this information, but in a slightly different format than Service B expects. For example, the shipping document for Service A might list the address first, whereas the document for Service B might list it last. In another case, Service B might call the zip code element "Postal Code," whereas Service A names it "Zip Code."

One previous solution of service developers is to create a transformation between the two documents by hand. Manual translation of the XML documents is extremely time consuming, and is unacceptable in a web services environment where information sources frequently change and corresponding applications must quickly evolve to meet that change.

In order to automate the transformation of XML documents (e.g., business documents), there are two fundamental problems that need to be addressed. Previous transformation techniques inadequately transformed between XML documents.

First, potential mappings between elements of two documents must be identified. For example, identifying that "Postal Code" in one document corresponds to "Zip Code" in another document. Previously, in the related field of schema translation between relational databases, the analysis and reconciliation between sets of heterogeneous relational schemas was performed by measuring the similarity of element names, data types, and structures. For example, reasoning about queries are used to create initial mappings between relational schemas. These initial mappings are then refined using data examples. However, because relational schemas are flat, hierarchical XML schemas cannot be related using these previous techniques.

Second, a "plan" for performing the actual transformation of the XML document data schemas must be created and can be related to work done in the area of tree matching. Previous techniques address the change detection problem for ordered and unordered trees, respectively. However, previous tree matching techniques are not applicable to the XML domain. For example, prior art tree matching techniques treat the "label" as a second class citizen. As a result, the cost of relabeling is assumed to be cheaper than that of deleting a node with the old label and inserting a node with the new label. This is an invalid assumption for the XML domain.

Thus, a need exists for decreasing the time, cost, and resources spent on transforming one XML document to another XML document in the web services industry.

SUMMARY OF THE INVENTION

The present invention provides a method and system for the transformation between two extensible markup language (XML) documents. Specifically, embodiments of the present invention disclose a system and method comprising modeling a source XML document corresponding to a source schema as a source tree having a plurality of source nodes, and modeling a target XML document corresponding to a target schema as a target tree having a plurality of target nodes. A sequence of transformation operations that transforms the source tree to the target tree is then generated.

BRIEF DESCRIPTION OF THE DRAWINGS

FIG. 5a is a partial subtree diagram of the DTD of FIG. 3a, in accordance with one embodiment of the present invention.

FIG. 5b is a partial subtree diagram of the DTD of FIG. 3a, in accordance with one embodiment of the present invention.

FIG. 5c is a partial subtree diagram of the DTD of FIG. 3a, in accordance with one embodiment of the present invention.

The drawings referred to in this description should be understood as not being drawn to scale except if specifically noted.

DETAILED DESCRIPTION

Figure 1:
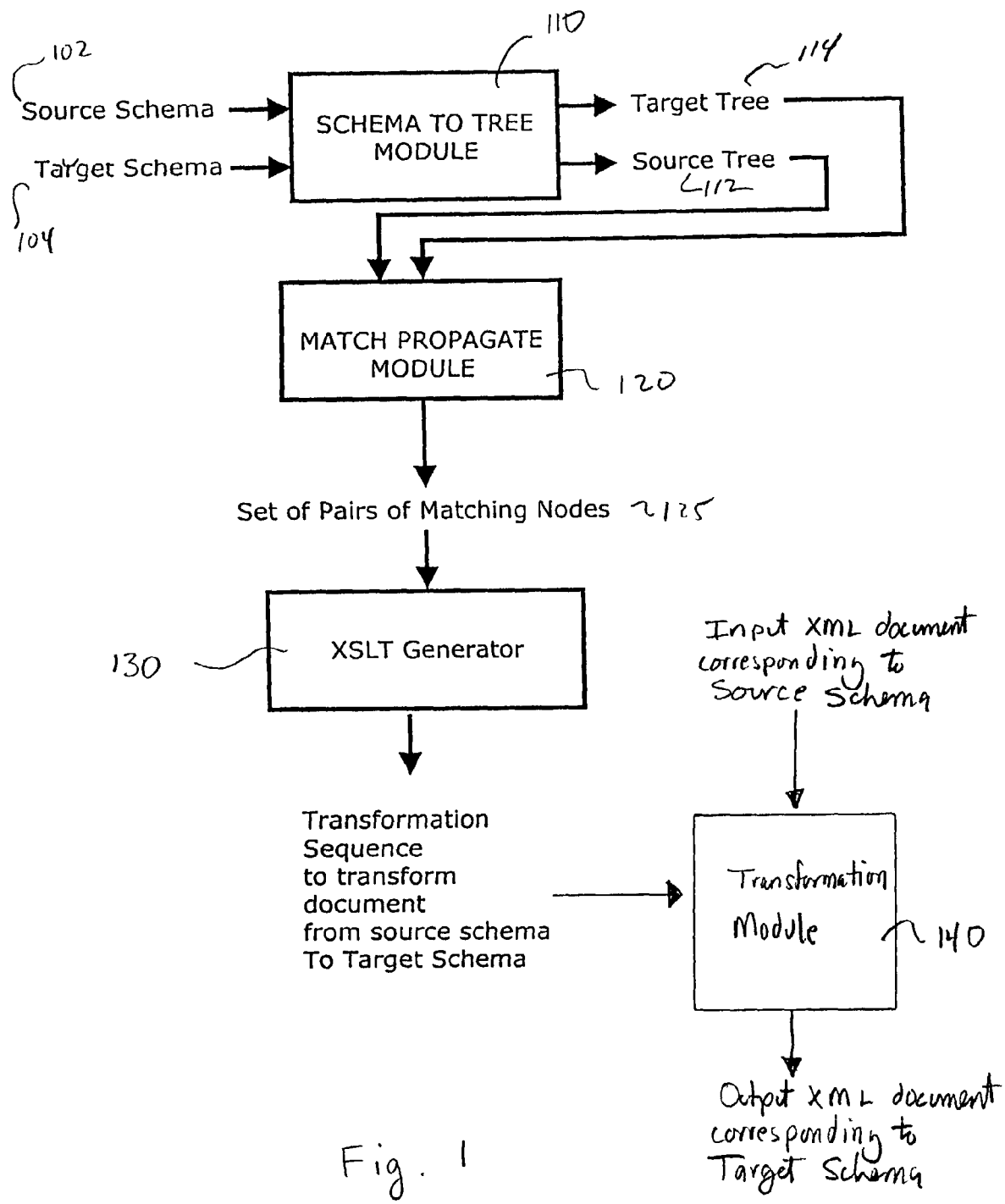
FIG. 1 illustrates a data flow diagram for transforming a source XML document into a target XML document, in accordance with one embodiment of the present invention.

FIG. 1 is an block diagram of a system 100 that is capable of discovering the sequence of transformation operations to transform one XML schema to another XML schema, in accordance with one embodiment of the present invention. FIG. 1 shows the system 100 includes three modules.

Embodiments of the present invention are implemented on software running on a computer system. The computer system can be a personal computer, notebook computer, server computer, mainframe, networked computer, handheld computer, personal digital assistant, workstation, and the like.

The first module is a schema to the tree module 110. A source schema 102 that corresponds to a source XML document is inputted into the module 110 to obtain a source tree 112. Similarly, the target schema 104 that corresponds to a target XML document is inputted in a module 110 to obtain a target tree 114.

Thereafter, the source tree 112 and target tree 114 are matched together in the match propagate module 120. In module 120, a relationship between the source tree 112 and target tree 114 is determined, and a transformation sequence is created for matching and transforming a plurality of source nodes in the source tree to a plurality of target nodes in the target tree. A set 125 of pairs of matching nodes are generated as an output of module 120.

In one embodiment, the set of schema transformation operations is described to capture common discrepancies between alternative document type definition (DTD) design behaviors for modeling a given entity. The set of transformation operations establish semantic relationships between two XML document schemas in order to facilitate the transformation between a source XML document and a target XML document in a sequence of transformation operations.

Thereafter, the Extensible Stylesheet Language for Transformations (XSLT) generator 130 translates the sequence of transformation operations into an equivalent XSLT transformation script. A transformation module 140 utilizes the transformation script to transform an input XML document corresponding to the source schema 102 to the target XML document corresponding to the target schema 104.

Figure 9:
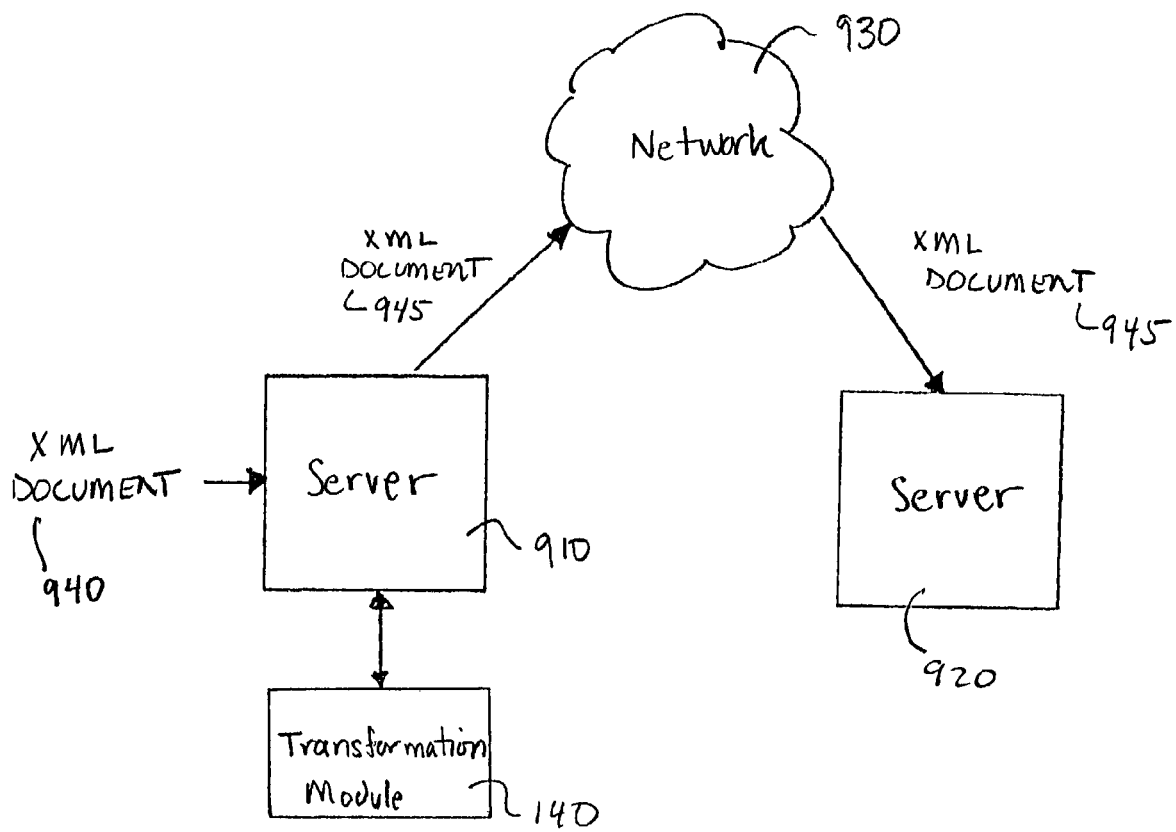
FIG. 9 illustrates a block diagram of an exemplary communication system that is capable of transforming a source XML document into a target XML document, in accordance with various embodiments of the present invention.
Figure 10:
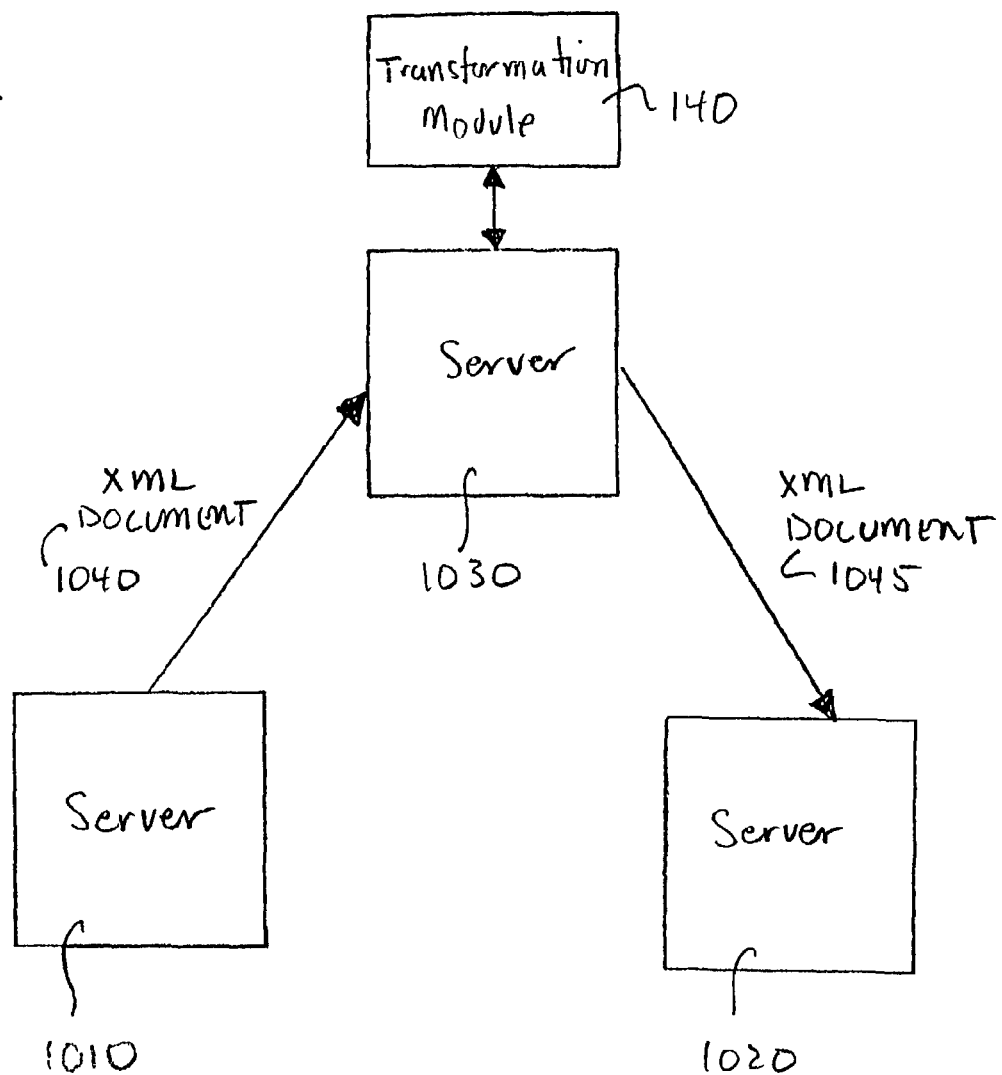
FIG. 10 illustrates a block diagram of an exemplary communication system that is capable of transforming a source XML document into a target XML document, in accordance with various embodiments of the present invention.

FIGS. 9 and 10 are block diagrams of communications systems 900 and 1000, respectively, illustrating locations of the transformation module 140, in accordance with embodiments of the present invention.

In system 900, the transformation module 140 is located at a server 910, or on a stand alone machine accessed and associated with server 910. In one embodiment, the transformation module 140 creates the transformation operations that transforms an XML document 940 into XML document 945. XML document 940 corresponds to a first XML schema, and XML document 945 corresponds to a second XML schema that server 920 is able to understand and interpret. The transformation is necessary because server 920 is unable to understand and interpret any XML document (e.g., document 940) corresponding to the first XML schema. Then, server 910 applies the transformation operations to XML document 940 in order to create XML document 945. Thereafter, server 910 sends the XML document 945 through a network 930 (e.g., Internet) to server 920. In addition, the transformation module could just as well be located at server 920 to provide the same transformation functionality.

In system 1000, the transformation module is located at a remote server 1030, or on a stand alone machine accessed and associated with server 1030, in accordance with one embodiment of the present invention. XML document 1040 corresponds to a first XML schema that server 1010 is able to understand and interpret. XML document 1045 corresponds to a second XML schema that server 1020 is able to understand and interpret. The transformation between XML document 1040 and 1045 is necessary because server 1020 is unable to understand and interpret any XML document (e.g., document 1040) that corresponds to the first XML schema. As such, transformation module 140 creates the transformation operations that transforms XML document 1040 into XML document 1045. In the present embodiment, server 1030 transforms XML document 1040 into XML document 1045 suing transformation operations created by transformation module 140 and then sends XML document 1045 to server 1020.

Figure 8:
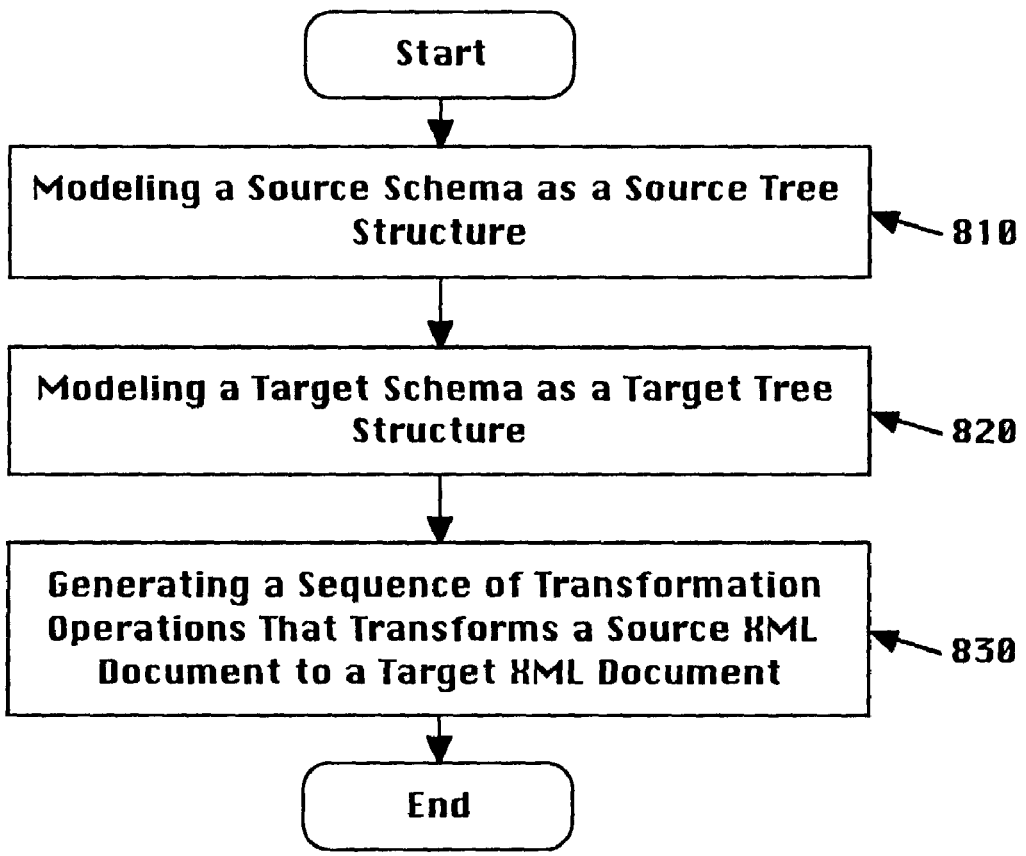
FIG. 8 is a flow diagram illustrating steps in a method for generating a transformation sequence to transform a source XML schema to a target XML schema, in accordance with one embodiment of the present invention.

The flow chart 800 of FIG. 8 illustrates steps in a method for generating a sequence of transformation operations that transforms a source XML document to a target XML document, in accordance with one embodiment of the present invention. The source XML document is associated with a source XML schema. The target XML document is associated with a target XML schema.

The present embodiment begins by modeling the source schema and the target schema in a tree structure. In FIG. 8, the source schema that corresponds to a source XML document is modeled as a source tree, in step 810. Similarly, the target schema that corresponds to a target XML document is modeled as a target tree, in step 820.

In one embodiment, the source and the target schemas are document type definition (DTD) documents. Since DTD is a dominant industry standard, the problem of transforming a document that conforms to a source DTD to a target DTD is described, in accordance with one embodiment of the present invention. A DTD describes the structure of XML documents as a list of element type declarations.

Figure 2:
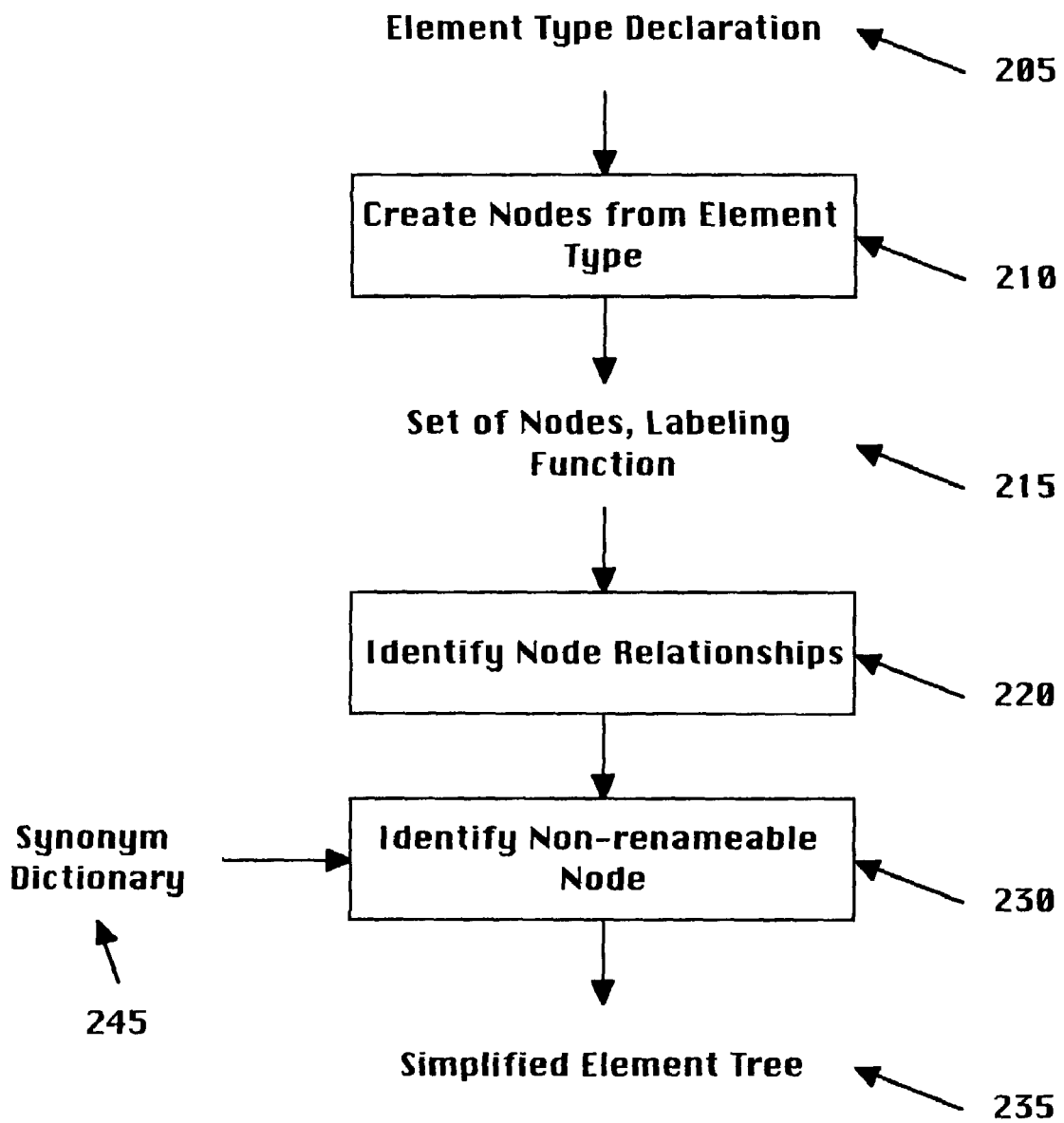
FIG. 2 illustrates a flow diagram illustrating steps in a method for generating a simplified element tree, in accordance with one embodiment of the present invention.

FIG. 2 is a flow chart 200 illustrating steps in a process for modeling an XML schema into tree structure as performed in steps 810 and 820 of FIG. 8, in accordance with one embodiment of the present invention. In step 210, nodes are created from an element type declaration 205. A set of nodes 215 is created with a labeling function for each of the nodes representing properties of that node.

In step 220 node relationships between each of the nodes in the set of nodes 215 is generated. In step 230, non-renameable nodes are identified using a synonym dictionary 245, in one embodiment. As such, the XML schema with element type declaration 205 is modeled as a tree 235, as illustrated in FIG. 200. The tree 235, denoted as T=(N, p, l), is comprised of the following: where N is the set of nodes, p is the parent function representing the parent relationship between two nodes, and l is the labeling function representing that node's properties. A node "n" in the set of nodes N is categorized on its label l(n). The two categories of nodes in the set N are tag nodes and constraint nodes.

Although the present embodiment describes a transformation between DTD documents, embodiments of the present invention are well suited to transformations between documents using other XML schemas.

In another embodiment, the names of tag nodes appear as tags in the XML documents. As such, tag nodes represent XML document tags. Each element node, n, in a tag node is associated with an element type T. Its label, l(n), is a singleton in the format of [Name] where Name is T's name.

In addition, in another embodiment, each attribute node, n, in a tag node is associated with an attribute type T. Its label l(n) is a quadruple in the format of [Name, Type, Def, Val] where Name is T's name, Type is T's data type (e.g., CDATA etc.), Def is T's default property (e.g., #REQUIRED, #IMPLIED etc.), and Val is T's default or fixed value, if any.

In still another embodiment, for constraint nodes, the names of constraint nodes do not appear in the XML documents. Constraint nodes capture relationships between the tags in the XML document. There are two types of constraint nodes: list nodes and quantifier nodes.

A list node represents a connector for associating other nodes to a content particle. For example, each list node, n, indicates how its children are composed, that is, by sequence (e.g., l(n)=[","]) or by choice (e.g., l(n)=["|"]).

A quantifier node in a constraint node serves as a connector that indicates the number of times a child node can occur in a parent node. For example, a quantifier node represents whether its children occur in its parent's content model one or more times (e.g., l(q)=["+"], called a "plus" quantifier node), zero or more times (e.g., l(q)=["*"], called a "star" quantifier node), or zero or one time (e.g., l(q)=["?"], called a "qmark" quantifier node).

In one embodiment, a tree rooted at a node of element type T is called T's type declaration tree. It is assumed that each DTD has a unique root element type. Tables 1 and 2, as listed below, show two sample DTDs of web-service purchase orders. Table 1 is an exemplary DTD 1 describing a purchase order for web service A. Table 2 is an exemplary DTD 2 describing a purchase order for web service B.

TABLE 1

Document Type Definition (DTD) 1

<!ELEMENT company (address, cname, personnel)>
<!ATTLIST company id ID #REQUIRED>
<!ELEMENT address (street, city, state, zip)>
<!ELEMENT personnel (person)+>
<!ELEMENT person (name, email?, url?, fax+)>
<!ELEMENT family (#PCDATA)>
<!ELEMENT given (#PCDATA)>
<!ELEMENT middle (#PCDATA)>
<!ELEMENT name (family|given|middle?)*>
<!ELEMENT cname (#PCDATA)>
<!ELEMENT email (#PCDATA)>
<!ELEMENT street (#PCDATA)>
<!ELEMENT city (#PCDATA)>
<!ELEMENT state (#PCDATA)>
<!ELEMENT zip (#PCDATA)>
<!ELEMENT url (#PCDATA)>
<!ELEMENT fax (#PCDATA)>

TABLE 2

Document Type Definition (DTD) 2

<!ELEMENT company (cname, (street, city, state, postal), personnel>
<!ATTLTST company id ID #REQUIRED>
<!ELEMENT personnel (person) +>
<!ELEMENT person (name, email+, url?, fax?, fax, phonenum)>
<!ELEMENT last (#PCDATA)>
<!ELEMENT first (#PCDATA)>
<!ELEMENT name (first, last)>
<!ELEMENT cname (#PCDATA)>
<!ELEMENT email (#PCDATA)>
<!ELEMENT street (#PCDATA)>

TABLE 2-continued

Document Type Definition (DTD) 2

<!ELEMENT city (#PCDATA)>
<!ELEMENT state (#PCDATA)>
<!ELEMENT postal (#PCDATA)>
<!ELEMENT url (#PCDATA)>
<!ELEMENT fax (#PCDATA)>
<!ELEMENT phonenum (#PCDATA)>

Figure 3A:
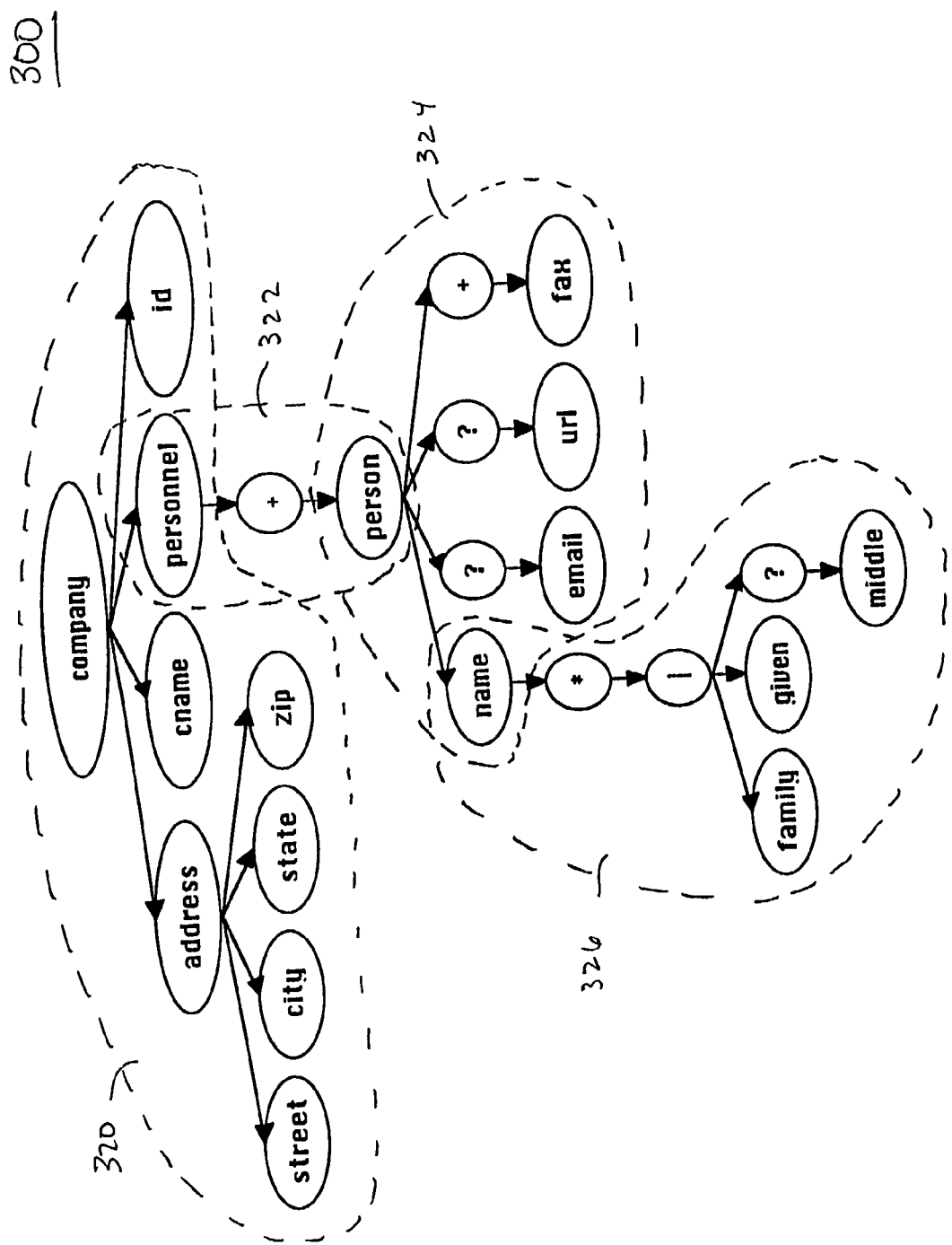
FIG. 3a is a tree diagram of a DTD, in accordance with one embodiment of the present invention.
Figure 3B:
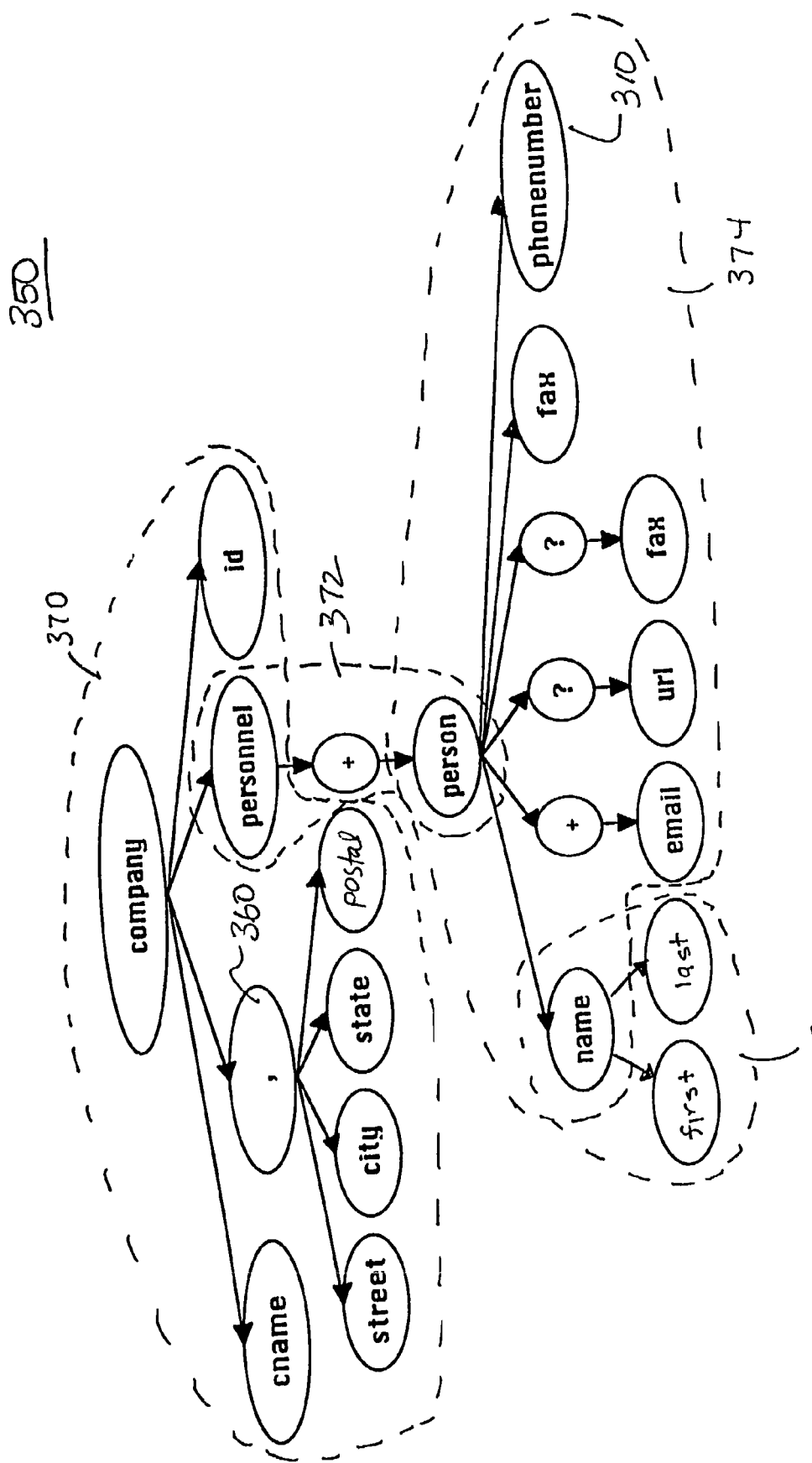
FIG. 3b is a tree diagram of a DTD, in accordance with one embodiment of the present invention.

FIGS. 3a and 3b are diagrams modeling the purchase orders of FIGS. 2a and 2B, respectively, as DTD trees, in accordance with one embodiment of the present invention. FIG. 3a illustrates a DTD tree 300 having various nodes and FIG. 3b illustrates a DTD tree 350 having various nodes. For simplicity, in FIGS. 3a and 3b, each node is marked with its name rather than a complete label. Since each element type declaration is composed of a list of content particles enclosed in parentheses (optionally followed by a quantifier), the outermost parenthesis construct is not modeled as a sequence list node in the DTD trees. Throughout the body of this Specification, each node is referenced by its name n with a subscript i indicating the number of the DTD it is within, i.e., $<n>_i$.

Returning to FIG. 8, flow chart 800 then generates the sequence of transformation operations by matching and transforming each of the source nodes in the source tree to corresponding nodes in the target tree, in step 830. In another embodiment, the sequence of transformation operations is generated automatically.

Taxonomy of the Transformation Operations

Two primary causes of discrepancies between the components of DTDs modeling the same concepts are identified, in accordance with one embodiment of the present invention. First, the properties of the concepts may differ. For example, phone number in node 310 is required as contact information in DTD 350 of FIG. 3b, while it is not required in DTD 300 of FIG. 3a. Second, due to the relatively freeform nature of XML (and lack of standards for DTD design), a given concept can be modeled in a variety ways. For example, an atomic property can be represented as either a #PCDATA sub-element or an attribute.

A set of transformation operations, listed below incorporates common DTD design behaviors, in accordance with one embodiment of the present invention, and are listed below:
1. Add(T, n): Add a new content particle (subtree) T to n's content model.
2. Insert(n, p, C): Insert a new node, n, under node p with n a quantifier node or a sequence list node and move a subset of p's children, C, to become n's children. If n is a quantifier node, change the occurrence property of the children C in p's content model from "exactly once" to correspond to n. If n is a sequence list node, put the nodes C in a group.
3. Delete(T): Delete subtree T. (Delete a content particle T from a content model.) This is the reverse operation of add.
4. Remove(n): Remove node n with n a quantifier or a sequence list node. All of n's children now become p(n)'s children. This is the reverse operation of insert.
5. Relabel (n, l, l'): Change node n's original label l to l'. The relabeling falls into the two categories as listed below:
   relabel within the same type (does not change the node's type): (a) Renaming between two element nodes, two attribute nodes or two quantifier nodes, but not between a sequence list node and a choice list node; and (b) Conversion between an attribute's default type Required and Implied.

relabel across different types (changes the node's type): (a) Conversion between a sequence list node and an element node which has children. This corresponds to using a group or encapsulating the group into a new element type. For example, we encapsulate a group composed of street, city, state and zip into element type "address" in node 360 in FIG. 3b. (b) Conversion between an attribute node with type CDATA, default type #REQUIRED, no default or fixed value and a #PCDATA element node; (c) Conversion between an attribute node of default property #IMPLIED and a #PCDATA element node with a qmark quantifier parent node.

6. Unfold(T, <$T_1, T_2, \ldots, T_i$>): Replace subtree T with a sequence of subtrees $T_1, T_2, \ldots, T_i$. T must root at a repeatable quantifier node. $T_1, T_2, \ldots,$ and $T_i$, satisfy that: (1) they are adjacent siblings; and (2) they or their subtrees without a qmark quantifier root node are isomorphic. Unfold recasts a repeatable content particle as a sequence of non-repeatable content particles. For example, <!ELEMENTstudent(phone+)> unfolds to <ELEMENTstudent(phone?, phone)> or <ELEMENTstudent(phone, phone)>.

7. Fold(<T, <$T_1, T_2, \ldots, T_i$>, T): This is the reverse operation of unfold.

8. Split(s1, <t1, t2>): a sequence list node s1 is split into star quantifier node t1 and a choice list node t2. Because there is no DTD operator to create unordered sequences, tuples <a, b> tend to be expressed using the construct (a|b)* rather than (a,b)|(b,a). This operation corresponds to converting an ordered sequence to an unordered one. For example, (a, b) is split to (a|b)*.

9. Merge(<s1, s2>,t1): s1 and s2 are merged into a single node t1 with t1 a star quantifier node, t2 a choice list node, and n3 a sequence list node. This is the reverse operation of split.

Constraints on the Transformation Operations

While atomic operations reflect intuitive transformations, some combinations of operations may result in non-intuitive transformations, in accordance with one embodiment of the present invention. For example, suppose DTD tree 300 of FIG. 3 contained an element declaration: <!ELEMENT company (name,address,webpage)>, and DTD tree 350 contained a corresponding declaration: <!ELEMENT company (CEO, webpage)> <!Element CEO (name,address)>. The DTD tree can be derived from DTD tree 300 by first inserting a sequence list node above name and address, and then relabeling the sequence list node to tag node CEO. This is equivalent to the forbidden operation of inserting a tag node CEO above name and address.

Common design patterns show that an element type declaration will not be deeply nested, in accordance with one embodiment of the present invention. Typically, the maximum depth of an element type's declaration tree is typically around 2 or 3. The average depth is even lower. According to this design pattern, if a node $n_1$ has a matching partner $n_2$, it is highly likely that $n_1$ and $n_2$ have a similar depth in the subtrees rooted at their nearest matching ancestors in the DTD trees. Therefore, only change scripts that do not violate the following constraint: that a node cannot be operated on directly more than once, with the following exceptions: (1) unfold following or followed by relabel; and (2) relabel performed between an attribute and an element following or followed by deletion or addition of qmark quantifier node.

Cost Model

These operations can be combined into a variety of equivalent transformation scripts. In order to facilitate selection among alternative transformations, a cost model evaluates the cost of transformation operations in terms of their impact on the data capacity of the document schemas, in accordance with one embodiment of the present invention. Relative information capacity measures the semantic connection between database schemas. For example, two schemas are considered equivalent if and only if there is a one-to-one mapping between a data instance in the source and the target schema. The data capacity of an XML document is the collection of all of its data. In addition, it is assumed that the DTDs are flat, such that, no schema information (e.g., element or attribute's names in one DTD) are stored as PCDATA or attribute values in an XML document conforming to another DTD. Hence, only PCDATA and attribute values are considered in XML documents as data.

A concept of "data capacity gap" is now introduced, in one embodiment of the present invention. Transformation operations that must result in the loss of data are examples of data capacity reducing (DC-Reduce). An example is the delete operation. Correspondingly, data capacity increasing (DC-Increase) operations (e.g., add), and data capacity preserving (DC-Preserve) (e.g., merge) are examples of data capacity gap. However, for some operations, it is difficult to determine from the DTDs alone whether the transformation will result in the loss, addition, or preservation of data capacity. For example, the operation remove quantifier node <"*"> changes the content particle from non-required to required which may cause an increase in data. The operation also changes the content particle from repeatable to non-repeatable which may cause data reduction. These transformations are called data capacity ambiguous (DC-Ambiguous). The term, DC(op) is used to denote this cost for a transformation operation.

Although some transformations are data capacity preserving, there may still be a potential data capacity gap between a document conforming to the source DTD and one conforming to the target DTD. For example, the operation insert a quantifer node <"+"> is a DC-Preserve transformation. However, it changes the children content particles' occurrence property from non-repeatable to repeatable and then allows the XML documents to accommodate more data in the future. The term, PDC(op), is used to denote this cost for a transformation operation.

A definition can be formed: PDC(op)=$w_{required}$* required_changed(op)+$w_{repeatable}$*repeatable changed(op), in accordance with one embodiment of the present invention. The required changed(op) and repeatable changed(op) are two boolean functions that indicate whether the properties "required" or "repeatable" of the content particles that are operated on by op are changed or not. Weights $w_{required}$ and $w_{repeatable}$ indicate the importance of the change of the corresponding property to the potential data capacity. Only operations inserting, removing or renaming a quantifier node may have a PDC cost that is not "0."

The number, size or property of operands involved in an operation may impact the data capacity, or, the potential data capacity gap, in accordance with one embodiment of the present invention. An operand factor, Fac(op), is used to denote this cost for a transformation operation. For instance, the operation of merging a smaller set of non-repeatable content particles to a repeatable content particle causes a greater potential data gap than that of merging a larger set. In another example, when relabelling occurs between two tag nodes, if their names are synonyms, Fac(op) is 0. If no knowledge about the two names' relationship is available, Fac(op) is then proportional to their name strings' similarity. A relationship is established as follows:

Cost(op)=(DC(op)+PDC(op))*Fac(op).

Generation of Simplified Element Tree Matches

In one embodiment, the domain of business documents that are exchanged between services shares a common ontology. Name similarity is used as the first heuristic indicator of a possible semantic relationship between two tag nodes. For example, in FIGS. 3a and 3b, each document root has a child node named personnel, so without looking at their descendants, these two nodes can be matched.

Further, the matching between the descendants of two personnel nodes are matched by comparing the two personnel's type declaration trees separately. However suppose in DTD 350 of FIG. 3b, people were used instead of personnel and no synonym knowledge was given. It would be necessary to then look further at the descendants of personnel and people to decide whether to match them.

In order to represent the semantic relationships between two XML documents, a simplified element tree is introduced, which is designed to capture the relationship between specific elements of the two documents, in accordance with one embodiment of the present invention. When two DTDs are provided, a tag node is non-renameable if there exists any tag in the other DTD whose name is the same or a synonym.

A simplified element tree of element type E, denoted as ST(E), is a subtree of T's type declaration tree T(E) that roots at T(E)'s root with each branch ending at the first non-rename-able node reached. In FIGS. 3a and 3b, the four subtrees within the dashed lines are simplified element trees of company, personnel, person and name in the two DTDs 300 and 350, respectively. For example, FIG. 3a shows the following subtrees: company 320, personnel 322, person 324, and name 326. In FIG. 3b, the subtrees are designated as follows: company 370, personnel 372, person 374, and name 376.

Each name-match node can be associated with some cost factor. For example, the cost factor may indicate the "confidence" or "accuracy" of the match. The name-match nodes, combined with factors, can be used to reason about the simplified element tree in an abstract manner.

Figure 6:
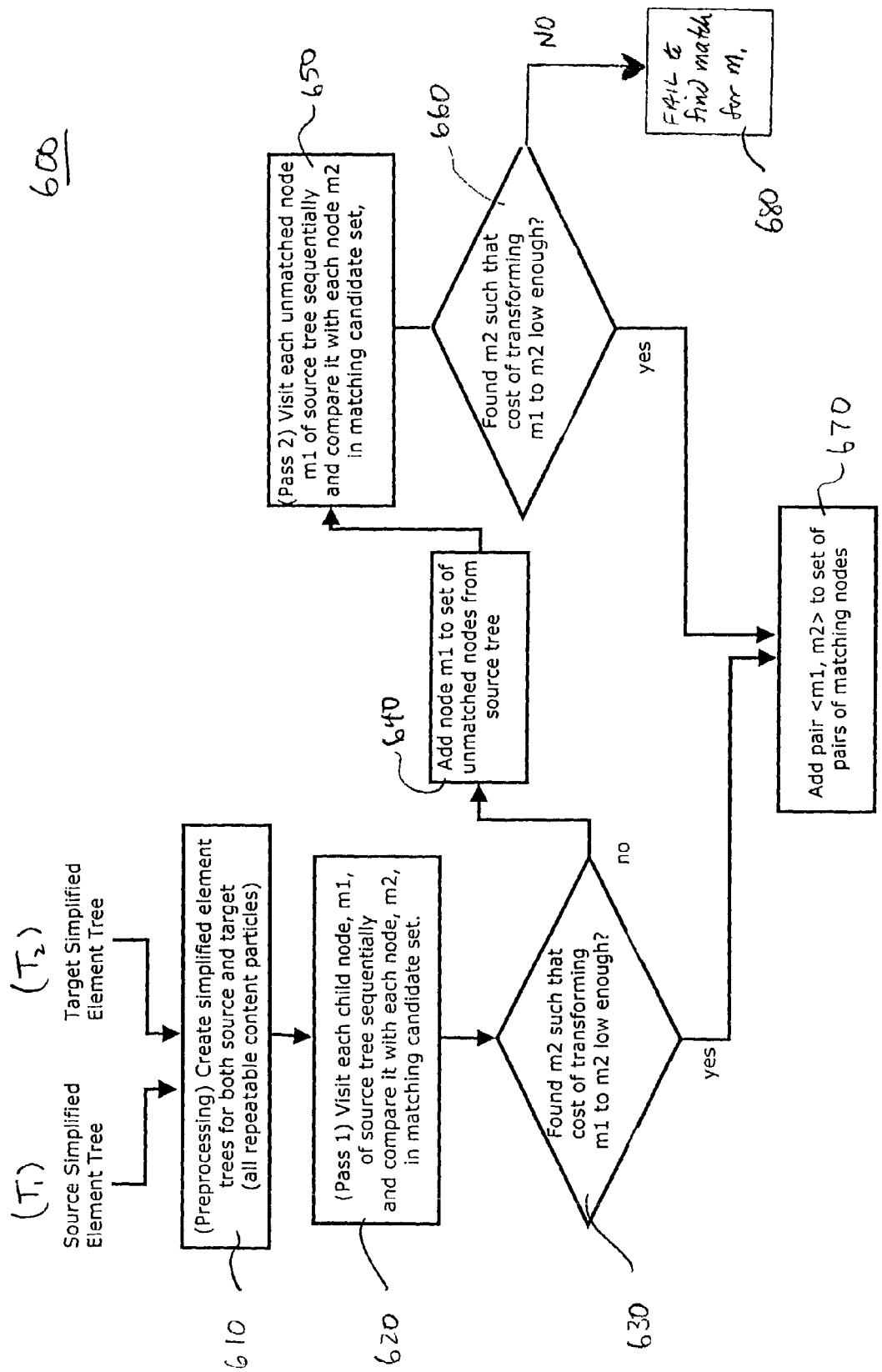
FIG. 6 is a flow diagram illustrating steps in a method for matching nodes between a source tree and a target tree, in accordance with one embodiment of the present invention.

FIG. 6 is a flow chart 600 of steps in a method for matching nodes between two XML DTDs. In one embodiment, an XML-structure-specific tree matching process matches nodes between two XML DTDs. The process is hereinafter referred to as the matchPropagate process. The general unordered tree matching problem is a notoriously high complexity non-polynomial (NP) problem. The typical assumption about relabelling does not hold in XML document matching, and thus those techniques do not apply. The matchPropagate tree matching process incorporates the domain characteristics of specific DTD tree transformation operations and the imposed constraints.

Given a source simplified element tree, $T_1$, and a target simplified element tree, $T_2$, nodes in $T_1$ are called source nodes, and nodes in $T_2$ are called target nodes, in one embodiment as illustrated in FIG. 6. If $n_1$ and $n_2$ are a source and a target node, respectively, the matchPropagate process discovers a sequence of operations that transforms the subtree rooted at $n_1$ to the subtree rooted at $n_2$. The cost of the script is then the cost of matching $n_1$ and $n_2$.

The matchPropagate process is composed of two phases, in accordance with one embodiment of the present invention. The first phase is the preprocessing phase of step 610. In step 610, the present embodiment creates two special nodes, namely, $\Phi_1$, mapped to deleted nodes and $\Phi_2$, mapped to removed nodes. Hence the operations add, insert, delete, remove and relabel set up a one-to-one mapping relationship. On the other hand, the operations unfold, fold, split and merge set up a one-to-many relationship. For example, unfold maps one subtree to multiple subtrees, split maps two nodes (a star quantifier and a choice list node) to a sequence list node. In order to make the matching discovery process for each node uniform, the simplified element trees are pre-processed.

Figure 4A:
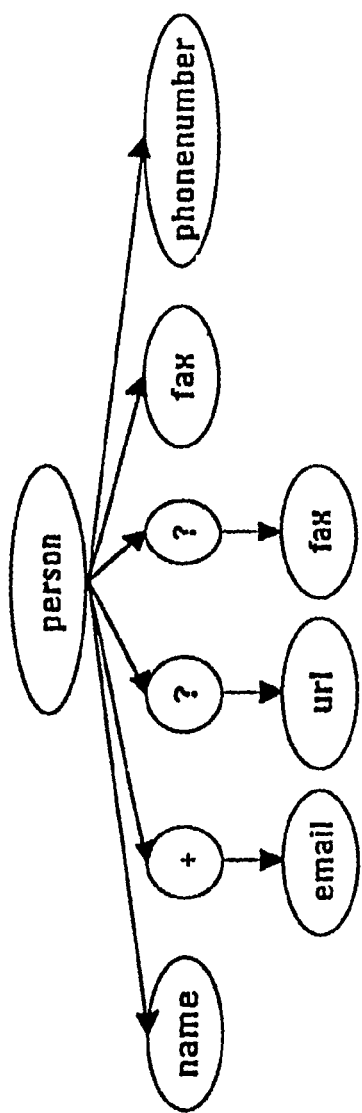
FIG. 4a is a partial subtree diagram of the DTD of FIG. 3b, in accordance with various embodiments of the present invention.
Figure 4B:
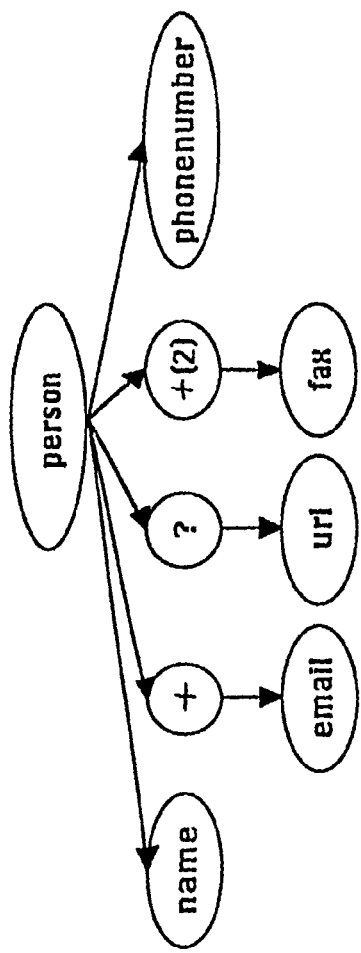
FIG. 4b is a partial subtree diagram of the DTD of FIG. 3b, in accordance with one embodiment of the present invention.

In the preprocessing phase of step 610, fold operations are first performed. For example, FIGS. 4a and 4b illustrate a fold operation on the subtree 374 of FIG. 3b. The subtree 374 illustrated in FIG. 4a will be converted to subtree 474 of FIG. 4b. The plus quantifier node will be marked with a number (2) indicating the maximum occurrence of content particle fax.

The merge operations are performed second. For example, FIGS. 5a, 5b, and 5c illustrate a merge operation on the subtree 326 of FIG. 3a. The subtree 326 of FIG. 5a is converted to the subtree 526b of FIG. 5b first. Since the outermost sequence list construct is always ignored and by default implied, subtree 526b of FIG. 5b will be converted to subtree 526c FIG. 5c. The name node 510 is marked with a letter d in name nodes 512 and 514 to indicate that the arbitrary order flexibility has been dropped.

In the second phase, one-to-one node mappings are found, in one embodiment. To derive the transformation from the subtree rooted at $n_1$ and the subtree rooted at $n_2$, for each child $m_1$ of $n_1$, an attempt is made to find a matching partner $m_2$ (a matching partner can be one of the special nodes $\Phi_1$ or $\Phi_2$). This matching discovery is done in two passes, or two matching iterations.

The present embodiment selects a plurality of candidate nodes in the target schema that are possible matches for each of the source nodes in the source schema.

In the first pass, each child $m_1$ of $n_1$ is visited sequentially and compared against a certain set of target nodes, the plurality of candidate nodes, in step 620 of flow chart 600. The set of nodes that will be compared with the current source node is termed, matching candidate set (S). A plurality of node transformation sequences is generated. Each of the plurality of node transformation sequences transforms the particular source node to one of the plurality of candidate nodes.

Since the constraint that a node cannot be directly operated on more than once applies, $m_1$'s matching partner $m_2$ can only be on the same level as $m_1$ (e.g., no operation or relabel operated on $m_1$) or one level deeper than $m_1$ (e.g., insert operated on $m_1$) or a special node (e.g., delete or remove operated on $m_1$), in accordance with one embodiment. By recursively applying the matchPropagate process to $m_1$ and each node s in S, a node k can be found with the least matching cost c, that is based on an information capacity cost criteria. The matching cost c is essentially a cost or measurement of lost data. A control strategy determines whether to match the node $m_1$ with k. Application of the control strategy determines if the selected node k satisfies a loss of data cost criteria that is the information capacity cost criteria, as implemented in step 630 of flow chart 600.

If a match is found between $m_1$ and $m_2$ of the target tree, then the pair ($m_1$, $m_2$) is added to the pair of matching nodes in step 670.

In the first pass, control strategy that is a delay-match scheme is applied which disallows matching $m_1$ to k if c is not low enough (i.e., c is not less than the cost of deleting $m_1$). This is illustrated in step 640, where the node $m_1$ is added to a set of unmatched nodes from the source tree.

After visiting all children of $n_1$, the present embodiment begins the second pass, in step 650. In step 650, the present embodiment visits each unmatched node $m_1$ of the source tree sequentially and compares it with each node $m_2$ in a matching candidate set, as discussed previously.

In step 660, the present embodiment traverses all unmatched children of $n_1$ again, and compares them against possible candidates. Again, the matchPropagate process is applied to $m_1$ and each node s in the set S in order to find the node k with the least matching cost c. Now a must-match scheme is applied in the second pass. This is in contrast to the delay-match scheme applied in the first pass. The node $m_1$ would be matched to k if c is less than the cost of deleting $m_1$ and adding k.

If no match is found between $m_1$ and $m_2$, then, the present embodiment fails to match that particular node in step 680. On the other hand, if a match is found between $m_1$ and $m_2$ of the target tree, then the pair ($m_1$, $m_2$) is added to the pair of matching nodes in step 670.

Table 300, illustrated below illustrates the matching candidate set, S, in the first pass, in one example. Table 400, following Table 300, illustrates the matching candidate set, S, in the second pass, for the same example.

TABLE 300

| Source | Matching Candidate Set |
|---|---|
| element | element node on the same level. |
| attribute | attribute node on the same level. |
| choice | choice node on the same level |
| sequence | sequence node on the same level or one level deeper; $\Phi_1$. |
| quantifier | quantifier node on the same level or one level deeper; $\Phi$. |

TABLE 400

| Source | Matching Candidate Set |
|---|---|
| element | element node on the same level. |
| | sequence node on the same level; |
| | attribute node on the same level. |
| attribute | element node on the same level. |
| choice | choice node on the same level or one deeper level. |
| sequence | sequence node on the same level or one level deeper; $\Phi_1$; |
| | quantifier node on the same level. |
| quantifier | quantifier node on the same level or one level deeper; $\Phi$; |
| | sequence node on the same level. |

For example, given two matching DTDs' root element types, R1 and R2, the process matchPropagate is applied to the roots of the simplified trees of $R_1$ and $R_2$ to propagate the matches down the tree and identify matches between the name-match nodes of element types $E_1$ and $E_2$. The matchPropagate process is then applied to $E_1$ and $E_2$'s simplified trees until no new name-match node matches are generated. In this way, a sequence of transformation operations is generated by combining each of the transformation sequences used to match each of the source nodes to a matched target node in the source XML schema, as implemented in step 830 of flow chart 800.

An example is now described illustrating the match discovery process between the DTD tree 300 of FIG. 3a and DTD tree 350 of FIG. 3b, in accordance with one embodiment. Suppose the following parameter settings are used, where the cost of each data capacity gap category ranks from lower to higher in the order of DC-Preserve (0.25), DC-Increase (0.5), DC-Ambiguous (0.75) and DC-Reduce (1.0). Also, the value 0.5 is assigned to both potential data capacity gap parameters $W_{required}$ and $w_{repeatable}$.

As shown in FIGS. 3a and 3b, there are 4 pairs of simplified element trees, i.e., company 320 and 370, personnel 322 and 372, person 324 and 374, and name 326 and 376, as discussed previously. The matchPropagate process is applied to the root type company's simplified element trees first. Then, the <company>$_{300}$'s children are traversed one by one. For <address>$_{300}$, its matching candidate set is empty since all the element nodes on the same level (i.e., 2) are non-rename-able. For <cname>$_{300}$, its matching candidate set contains only <cname>$_{350}$. Since they have the same name, they are matched. Similarly, <personnel>$_{300}$ is matched against <personnel>$_{350}$. The atching candidate set for attribute <id>$_{300}$ is empty.

In pass 2, <address>$_{300}$'s matching candidate set contains only <,>$_{350}$. The matchPropagate process is applied to derive the transformation script composed of an operation of relabelling "address" to ",". If the operand factor cost of relabelling a tag node to a sequence list node is the default value (e.g., Fac(op)=1), then the total relabelling cost is (DC(op)+PDC(op))*Fac(op)=(0.25+0)*1=0.25. The operand factor cost of deleting the subtree rooted at <address>$_{300}$ is the tree's leaf nodes' size, i.e., 4.

Furthermore, supposing $k_s$=1, the total cost is (DC(op)+PDC(op))*Fac(op)=(DC(op)+PDC(op))*$k_s$*s=(1.0+0)*1*4=4.0. Since this value is larger than 0.25, the <address>$_{300}$ is mapped against <,>$_{350}$. Attribute <id>$_{300}$'s matching candidate set now contains element <id>$_{350}$. Given the current parameter settings, they will be matched. The process of matching element type company is now complete, since each of <company>$_{300}$'s children has a partner.

As for matching element type personnel, the two simplified element subtrees 322 and 372 of FIGS. 3a and 3b, respectively, are isomorphic. The transformation script of matching <+>$_{300}$ against <+>$_{350}$ and matching <person>$_{300}$ against <person>$_{350}$ is then derived based on the isomorphic relationship.

For matching element type person, in the preprocessing phase, the simplified element tree shown 374 of FIGS. 4a and 3b has been converted to element subtree 474 shown in FIG. 4b. The node <name>$_{300}$ is matched against <name>$_{350}$ in pass 1. The node <?$_1$>$_{300}$'s matching candidate set includes <+$_1$>$_{350}$, <?$_1$>$_{350}$ and <+$_2$>$_{350}$. The transformation script associated with matching against <+$_1$>$_{350}$ is composed of a single operation of relabelling <?$_1$>$_{300}$ from ["?"] to ["+"].

The transformation script associated with matching against <?$_1$>$_{350}$ is composed of deleting <email>$_{300}$ and adding <url>$_{350}$. Matching against <+$_2$>$_{350}$ is associated with relabelling from ["?"] to ["+"], deleting <email>$_{300}$, adding <fax>$_{350}$, and unfolding <fax>$_{350}$. The node <+$_1$>$_{350}$ will be chosen as the partner since it is associated the least cost which is less than deleting <?$_1$>$_{300}$. Similarly, <?$_2$>$_{300}$ is matched against <?>$_{350}$ and <+>$_{300}$ is matched against <+$_2$>$_{350}$. The node <phonenum>$_{350}$ is matched against $\Phi_2$, since it is added.

For matching element type name, the simplified element tree 326 in FIGS. 5*a* and 3*a* is converted to the element tree 526*c* as shown in FIG. 5*c*. The element tree 526*c* is then compared to element tree 376 as shown in FIG. 3*b*. Suppose the synonym knowledge provides the information that family and last, given and first are synonyms, then we have <family>$_{300}$ matched against <last>$_{350}$, <given>$_{300}$ matched against <first>$_{350}$, and the subtree rooted at <?>$_{300}$ matched against $\Phi_2$.

Generation of XSLT for Transforming Documents

Based on the established semantic relationship between two DTDs, the Extensible Stylesheet Language Transformation (XSLT) language, designed for transforming individual XML documents, can be used to specify and then execute the transformation, in accordance with one embodiment of the present invention. XSLT understands exactly which nodes in the XML documents are operated on.

Figure 7:
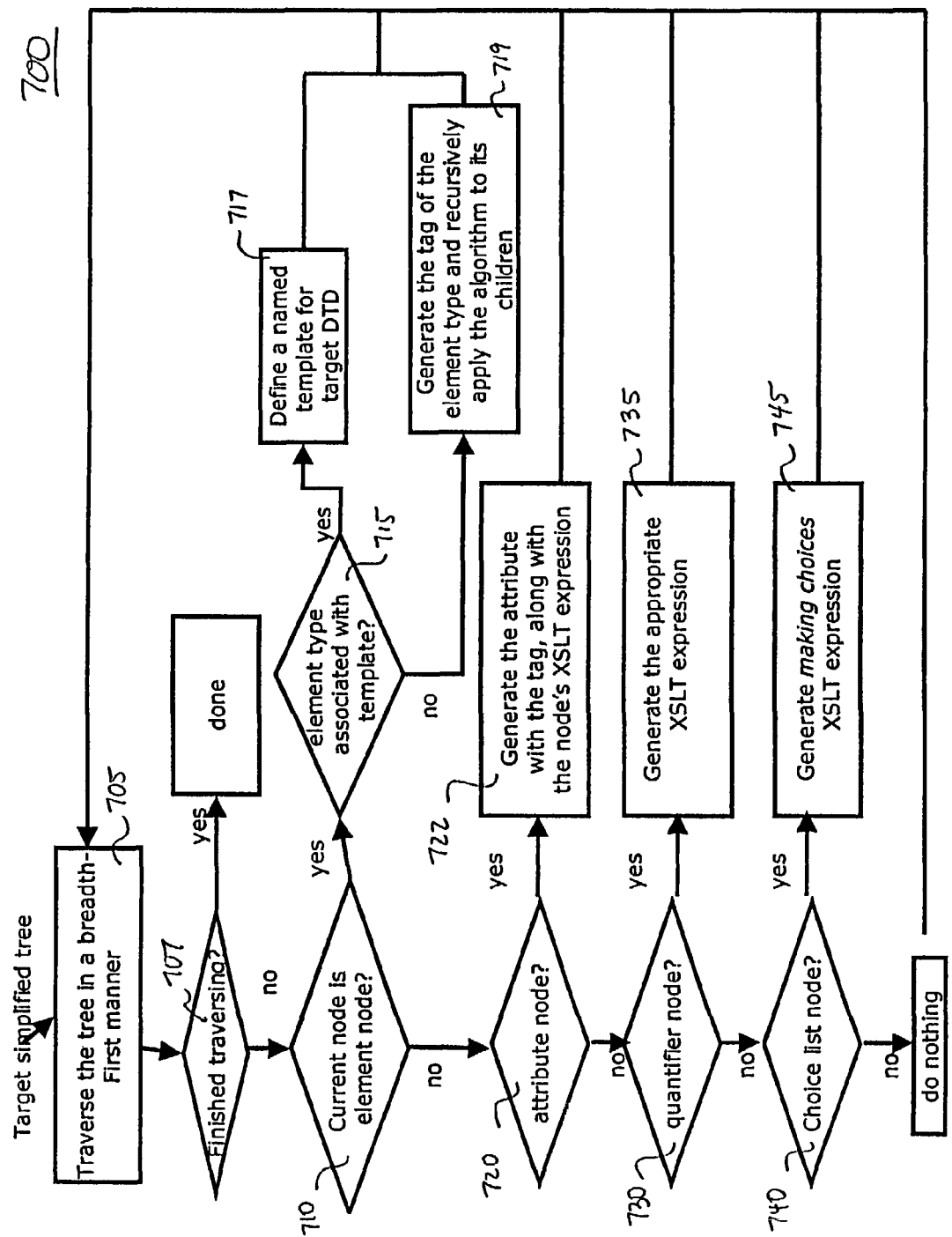
FIG. 7 is a flow diagram illustrating steps in a method for generating an Extensible Stylesheet language for Transformations (XSLT) script.

FIG. 7 is a flow chart 700 illustrating steps in a method for converting a sequence of transformation operations into an XSLT script, in accordance with one embodiment of the present invention. Each node n in the DTD tree is associated with a set of nodes in the XML tree which can be specified by an XSLT expression. By definition, this XSLT expression is n's XSLT expression.

For each matching element type pair, the two roots of the simplified element trees associated with the element types match, and the XSLT generator generates a named template. It then will traverse the target simplified element tree in a breadth-first manner in step 705. The present embodiment then proceeds to decision step 707 to determine if the traverse is finished. If yes, then the process in FIG. 7 is complete. The following discussion illustrates the XSLT expressions that are generated based on the visited node, in one example, when it is determined that the tree has not been fully traversed in step 707. The DTD 1 of Table 1 and the DTD 2 of Table 2 are used as examples for generating an XSLT script for transformation.

The type of node will determine how the XSLT transformation will occur. For example, in step 710, if an element node is to be transformed into an XSLT expression, the present embodiment determines if the element type is associated with a template, in step 715. A named template is defined for an element type in a target DTD, in step 717, if it is associated with a simplified element tree pair.

For example, in Tables 1 and 2, element type person in DTD 1 matches person in DTD 2 and then there is a named template person-trans defined for deriving target instances of element type person from source instances of person. If named template person-trans has not been defined yet, the template will be then generated. Once the generator reaches the tag node with name person, it will generate the following XSLT expressions:

```
<person>
    <xsl:call-template name = "person-trans"/>
</person>
```

However, if the element type is not associated with a template in decision step 715, then the present embodiment generates the tag of the element type and recursively applies the process to its children, in step 719. If this element node is of type #PCDATA, then an XSLT expression, xsl:value-of> is generated.

For example, an element type name is associated with a named template name-trans. To generate this template, the generator traverses name's i simplified element trees which is composed of the root of element type name itself and two children leaf tag nodes of type first and last. The following scripts are generated:

```
<xsl:templage match = "name" name = "name-trans">
    <first>
        <xsl:value-of select="given"/>
    </first>
    <last>
        <xsl:value-of select ="family"/>
    </last>
</xsl:template>
```

The present embodiment determines if the node is an attribute node in step 720. If it is an attribute node, then the attribute is generated with the tag along with the node's XSLT expression, in step 722.

The present embodiment determines if the node is a quantifier node in step 730, then in step 735, the present embodiment generates the appropriate XSLT expression. In one example, quantifier node n has a matching partner n'. The absence of a quantifier node between two non-quantifier nodes in DTD indicates that the content particle represented by the child node appears exactly one in the content model of the content particle represented by the parent node. Then, matching $\Phi_1$ to n (e.g., inserting n) as matching an implicit quantifer node whose properties are required and non-repeatable to n.

For example, if changing from n' to n is a data capacity preserving transformation, then the present embodiment generates a processing multiple elements XSLT expression (<xsl:for-each>). In the select clause, the present embodiment selects all the nearest descendant tag nodes of n'. For each such selected tag node, the expression <xsl: if> is generated with the test condition of deciding what element type is associated with the input node. Based on the element type, the process is recursively applied as illustrated below:

```
<xsl:for-each select = "person">
    <xsl:if test = "(local-name ( ) = 'person')">
        <person>
            <xsl:call-template name = "person-trans"/>
        </person>
    </xsl:if>
</xsl:for-each>
</xsl:template>
```

In another case, at least one target XML data node in a target XML document is required to be instantiated while its data source, a corresponding source XML data node, is not provided. Such is the case if the transformation of changing from n' to n changes the property of "required" from not required to required, or from countable-repeatable to countable-repeatable with an increasing repeating number, but, does not change the property of "repeatable" from repeatable to non-repeatable or countable-repeatable. In such an instance, the present embodiment will generate <xsl:if> to test whether the source data is available. If not, tags for reminding that additional data is needed are generated.

For example, the following XSLT script is generated when content particle email* in element type person is changed to email+.

```
<xsl:if test = "(count(email)=0)">
    <email>
        value needed here
    </email>
</xsl:if>
<xsl:for-each select = "email">
    <xsl:if test = "(local-name( ) = 'email')">
        <email>
            </xsl:apply-templates/>
        </email>
    </xsl:if>
</xsl:for-each>
```

In still another case, a situation may arise where only a subset of multiple data sources are needed to instantiate the target XML data nodes. Such is the case if the transformation of changing from n' to n changes the property of "repeatable" either (1) from repeatable to countable-repeatable to non-repeatable, or (2) from countable-repeatable to countable-repeatable with a decrease of the repeating number, and if the transformation does not change the property of "required" from not required to required. As such, the select clause is slightly different from the routine expression <xsl:for-each> generated for the current quantifier node. By default, the present embodiment instantiates the target XML data nodes by assigning the value from the first several source XML data nodes among all the available source XML data nodes.

For example, in DTD 2 of Table 2 the following XSLT scripts are generated when person's content model, content particles fax, and fax, are replaced by fax. At most one XML data node of type fax can be present.

```
<xsl:for-each select = "fax[position( )=1"> 
    <xsl:if test = "(local-name( ) = 'fax')">
        <fax>
            <xsl:apply-templates/>
        </fax>
    </xsl:if>
</xsl:for-each>
```

Returning now to step 740, if the present embodiment determines that the node is a list node, then for a sequence list node, no XSLT expressions are generated. However, if in step 740, a choice list node is determined, then the present embodiment generates a making choices XSLT expression (e.g., <xsl:if>), in step 745. Since choice list node indicates that one branch of this node's children will be chosen, <xsl:if> will change the output based on the input.

If no nodes are reached, as in element node in step 710, or attribute node in step 720, or quantifier node in step 730, or choice list node in step 740, then nothing is done, and the process returns to step 705.

While the methods of embodiments illustrated in flow chart 200, 600, 700, and 800 show specific sequences and quantity of steps for automatically transforming one XML document to another, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for automatically transforming one XML schema to another XML schema through a sequence of transformation operations, is thus described. The present invention incorporates domain-specific characteristics of the XML documents, such as, domain ontology, common transformation types, and specific DTD modeling constructs (e.g., quantifiers and type-constructors) to discover and develop the sequence of transformation operations. While the present invention has been described in particular embodiments, it should be appreciated that the present invention should not be construed as limited by such embodiments, but rather construed according to the below claims.

What is claimed is:

1. A method of document transformation comprising:
   a) modeling a source XML document corresponding to a source schema as a source tree having a plurality of source nodes;
   b) modeling a target XML document corresponding to a target schema as a target tree having a plurality of target nodes; and
   c) generating a sequence of transformation operations that transforms said source tree to said target tree based at least in part on data loss costs associated with the transformation operations, said sequence of transformation operations utilizing an extensible stylesheet language for transformations (XSLT) generator to translate the sequence of transformation operations into an equivalent XSLT transformation script and utilize the transformation script to transform an input XML document corresponding to the source schema to the target XML document corresponding to the target schema.

2. The method of document transformation as described in claim 1, wherein c) comprises:
   matching said plurality of source nodes to said plurality of target nodes.

3. The method of document transformation as described in claim 1, wherein c) comprises:
   automatically generating said sequence of transformation operations.

4. The method of document transformation as described in claim 1, further comprising:
   d) for each source node in said source schema, selecting a plurality of candidate nodes in said target schema that are possible matches;
   e) for each source node in said source schema, generating a plurality of node transformation sequences for transforming to each of said plurality of candidate nodes; and
   f) for each source node in said source schema, selecting one of said plurality of node transformation sequences, a selected node transformation sequence, for said sequence of transformation operations that is associated with a least cost of data loss.

5. The method of document transformation as described in claim 4, wherein f) further comprises:
   in a match between a source node and a target node, selecting said selected node transformation sequence to achieve a match, where a first cost of data loss for said match is less than a second cost of data loss when deleting information contained in said source node, in a first iteration of matching.

6. The method of document transformation as described in claim 5, further comprising:
   matching said source node to said target node having a synonymous label to achieve said match.

7. The method of document transformation as described in claim 4, wherein f) further comprises:
   in a match between a source node and a target node, selecting said selected node transformation sequence when an associated cost of data loss is less than a second cost of data loss when deleting source information contained in said source node and adding target information in said target node, in a second iteration of matching.

8. The method of document transformation as described in claim 4, wherein f) further comprises:
   selecting said selected node transformation sequence having the least associated cost of data loss.

9. A method of document transformation comprising:
   a) modeling a source schema of XML and a target schema of XML as a tree structure creating a source tree and a target tree, said source tree having a plurality of source nodes, said target tree having a plurality of target nodes; and
   b) generating a sequence of transformation operations that transforms said source XML document to said target XML document based at least in part on data loss costs associated with the transformation operations, wherein said plurality of source nodes of said source schema are matched and transformed to said plurality of target nodes in said target schema, said sequence of transformation operations utilizing an extensible stylesheet language for transformations (XSLT) generator to translate the sequence of transformation operations into an equivalent XSLT transformation script and utilize the transformation script to transform an input XML document corresponding to the source schema to the target XML document corresponding to the target schema.

10. The method of document transformation as described in claim 9, wherein b) comprises:
    b1) for each source node in said source tree, selecting a plurality of candidate nodes in said target tree that are possible matches;
    b2) for each source node in said source tree, generating a plurality of node transformation operations transforming to each of said plurality of candidate nodes; and
    b3) for each source node in said source tree, selecting one of said plurality of node transformation operations forming a selected node transformation operation having the least cost of data loss.

11. The method of document transformation as described in claim 10, further comprising:
    combining said selected node transformation operation for each of said source nodes matched to a target node into a sequence of transformation operations that transforms said source schema to said target schema.

12. The method of document transformation as described in claim 10, further comprising:
    converting said sequence of transformations operations into an Extensible Stylesheet Language for Transformations (XSLT) script.

13. The method of document transformation as described in claim 9, wherein said source schema is a source document type definition (DTD) and said target schema is a target DTD.

14. The method of document transformation as described in claim 9, further comprising:
    folding nodes in said source and target trees in a preprocessing phase to find one-to-one node matching.

15. The method of document transformation as described in claim 9, further comprising:
    merging nodes in said source and target trees in a preprocessing phase to find one-to-one node matching.

16. The method of document transformation as described in claim 9, further comprising:
    performing transformation operations only once at a node in said source tree and said target tree with the following exceptions:
    a) a relabel operation following an unfold operation;
    b) said unfold operation following said relabel operation;
    c) said relabel operation performed between an attribute and an element following or followed by a deletion or an addition of a qmark quantifier node.

17. A computer system comprising:
    a processor; and
    a computer readable memory coupled to said processor and containing program instructions that, when executed, implement a method of document transformation comprising:
    a) modeling a source XML document corresponding to a source schema as a source tree having a plurality of source nodes;
    b) modeling a target XML document corresponding to a target schema as a target tree having a plurality of target nodes; and
    c) generating a sequence of transformation operations that transforms said source tree to said target tree based at least in part on data loss costs associated with the transformation operations, said sequence of transformation operations utilizing an extensible stylesheet language for transformations (XSLT) generator to translate the sequence of transformation operations into an equivalent XSLT transformation script and utilize the transformation script to transform an input XML document corresponding to the source schema to the target XML document corresponding to the target schema.

18. The computer system as described in claim 17, wherein c) in said method comprises:
    matching said plurality of source nodes to said plurality of target nodes.

19. The computer system as described in claim 17, wherein c) in said method comprises:
    automatically generating said sequence of transformation operations.

20. The computer system as described in claim 17, wherein said method further comprises:
    d) for each source node in said source schema, selecting a plurality of candidate nodes in said target schema that are possible matches;
    e) for each source node in said source schema, generating a plurality of node transformation sequences for transforming to each of said plurality of candidate nodes; and
    f) for each source node in said source schema, selecting one of said plurality of node transformation sequences, a selected node transformation sequence, for said sequence of transformation operations that is associated with a least cost of data loss.

21. The computer system as described in claim 20, wherein f) in said method further comprises:
    in a match between a source node and a target node, selecting said selected node transformation sequence to achieve a match, where an associated cost of data loss for said match is less than a second cost of data loss when deleting information contained in said source node, in a first iteration of matching.

22. The computer system as described in claim 21, wherein said method further comprises:
    matching said source node to said target node having a synonymous label to achieve said high quality match.

23. The computer system as described in claim 20, wherein f) in said method further comprises:

in a match between a source node and a target node, selecting said selected node transformation sequence when an associated cost of data loss is less than a second cost of data loss when deleting source information contained in said source node and adding target information in said target node, in a second iteration of matching.

24. The computer system as described in claim 20, wherein f) in said method further comprises:

selecting said selected node transformation sequence having the least associated cost of data loss.

\* \* \* \* \*